(12) United States Patent
Hong et al.

(10) Patent No.: US 11,852,830 B2
(45) Date of Patent: Dec. 26, 2023

(54) AUGMENTED REALITY GLASS AND OPERATING METHOD THEREFOR

(71) Applicant: Samsung Electronics Co., Ltd., Suwon-si (KR)

(72) Inventors: Sungbin Hong, Suwon-si (KR); Yonghee Jeung, Suwon-si (KR); Dongok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/067,336

(22) Filed: Dec. 16, 2022

(65) Prior Publication Data

US 2023/0123519 A1    Apr. 20, 2023

Related U.S. Application Data

(63) Continuation of application No. PCT/KR2021/000791, filed on Jan. 20, 2021.

(30) Foreign Application Priority Data

Jun. 18, 2020   (KR) .................. 10-2020-0074406

(51) Int. Cl.
 *G02B 27/01* (2006.01)
 *G06F 3/01* (2006.01)
 *G09G 3/00* (2006.01)

(52) U.S. Cl.
 CPC ......... *G02B 27/0172* (2013.01); *G06F 3/013* (2013.01); *G09G 3/002* (2013.01); *G02B 2027/014* (2013.01); *G02B 2027/0178* (2013.01); *G02B 2027/0187* (2013.01); *G09G 2320/0626* (2013.01); *G09G 2354/00* (2013.01); *G09G 2360/144* (2013.01); *G09G 2360/145* (2013.01)

(58) Field of Classification Search
 None
 See application file for complete search history.

(56) References Cited

U.S. PATENT DOCUMENTS

| 9,625,723 | B2 | 4/2017 | Lou et al. |
| 10,445,573 | B2 | 10/2019 | Wilson |
| 10,528,128 | B1 | 1/2020 | Yoon et al. |
| 10,565,446 | B2 | 2/2020 | Gustafsson et al. |
| 2014/0375789 | A1 | 12/2014 | Lou et al. |

(Continued)

FOREIGN PATENT DOCUMENTS

| JP | H8-50256 A | 2/1996 |
| JP | H11-161191 A | 6/1999 |

(Continued)

*Primary Examiner* — Nicholas J Lee
(74) *Attorney, Agent, or Firm* — Jefferson IP Law, LLP

(57) ABSTRACT

Augmented reality (AR) glass is provided. The AR glass includes a first light source which emits display light for displaying an AR image, an eye tracking (ET) sensor for detecting reflected light reflected from the eye of a user, glass, which includes a display waveguide for guiding the display light, emitted from the first light source, to a display area of a see-through display, and an ET waveguide for guiding the reflected light to the ET sensor, and a processor electrically connected to the first light source and the ET sensor, wherein the processor controls the first light source so as to emit the display light, and tracks, through the ET sensor, the gaze of the user on the basis of the detected reflected light.

15 Claims, 10 Drawing Sheets

(56) References Cited

U.S. PATENT DOCUMENTS

| | | |
|---|---|---|
| 2015/0138451 A1 | 5/2015 | Amitai |
| 2016/0085300 A1 | 3/2016 | Robbins et al. |
| 2017/0108697 A1 | 4/2017 | El-Ghoroury et al. |
| 2018/0046859 A1 | 2/2018 | Jarvenpaa |
| 2018/0275410 A1 | 9/2018 | Yeoh et al. |
| 2018/0284460 A1 | 10/2018 | Cheng et al. |
| 2018/0356638 A1 | 12/2018 | Yang et al. |
| 2019/0056600 A1 | 2/2019 | Danziger et al. |
| 2020/0371366 A1 | 11/2020 | Gollier |

FOREIGN PATENT DOCUMENTS

| | | |
|---|---|---|
| JP | 2017-135605 A | 8/2017 |
| JP | 2020-13132 A | 1/2020 |
| KR | 10-2015-0013815 A | 2/2015 |
| KR | 10-2016-0022927 A | 3/2016 |
| KR | 10-2017-0059476 A | 5/2017 |
| KR | 10-2018-0070626 A | 6/2018 |
| KR | 10-2018-0135646 A | 12/2018 |
| KR | 10-2019-0099374 A | 8/2019 |
| KR | 10-2019-0126124 A | 11/2019 |
| KR | 10-2019-0130147 A | 11/2019 |

AUGMENTED REALITY GLASS AND OPERATING METHOD THEREFOR

CROSS-REFERENCE TO RELATED APPLICATION(S)

This application is a continuation application, claiming priority under § 365(c), of an International application No. PCT/KR2021/000791, filed on Jan. 20, 2021, which is based on and claims the benefit of a Korean patent application number 10-2020-0074406, filed on Jun. 18, 2020, in the Korean Intellectual Property Office, the disclosure of which is incorporated by reference herein in its entirety.

BACKGROUND

1. Field

The disclosure relates to augmented reality (AR) glasses and to a display waveguide and an eye tracking waveguide of augmented reality glasses.

2. Description of Related Art

Augmented reality (AR) is a field of virtual reality (VR) and indicates a computer graphic technique for synthesizing virtual objects or information with a real environment to show them as things that exist in the original environment. Augmented reality is a display technology for superimposing virtual objects on the real world viewed by the user and showing the same, which may be applied to a product such as a head-mounted display (HMD) or AR glasses to provide various experiences to the user. In addition, in order for the user to interact with the augmented reality provided through the AR glasses, a technology for tracking a user's gaze (eye tracking (ET)), based on the light reflected from the user's eyes, may be used.

The above information is presented as background information only to assist with an understanding of the disclosure. No determination has been made, and no assertion is made, as to whether any of the above might be applicable as prior art with regard to the disclosure.

SUMMARY

In order to provide augmented reality to the user through augmented reality (AR) glasses, a display optical system including a see-through display capable of superimposing and displaying virtual objects on the real world and a display waveguide, and an eye tracking optical system including eye tracking module capable of tracking a user's gaze and an eye tracking waveguide may be required. However, when the display waveguide and the eye tracking waveguide are combined for use, separate lighting (e.g., an infrared light source) may be required for the split between the light for display (e.g., visible light wavelength) and the light for eye tracking (e.g., infrared wavelength). In addition, the weight and volume of the display optical system and the eye tracking optical system disposed in the AR glasses may make it difficult to manufacture the AR glasses. Therefore, a technology capable of efficiently disposing the display optical system and the eye tracking optical system in the AR glasses may be required.

Aspects of the disclosure are to address at least the above-mentioned problems and/or disadvantages and to provide at least the advantages described below. Accordingly, an aspect of the disclosure is to provide an apparatus and a method for efficiently disposing the display optical system and the eye tracking optical system in the AR glasses.

Additional aspects will be set forth in part in the description which follows and, in part, will be apparent from the description, or may be learned by practice of the presented embodiments.

In accordance with an aspect of the disclosure, an augmented reality (AR) glasses is provided. The AR glasses includes a first light source configured to emit display light for displaying an augmented reality image, an eye tracking (ET) sensor configured to detect reflection light reflected from user's eyes, a glass member including a display waveguide configured to guide the display light emitted from the first light source to a display area of a see-through display and an eye tracking (ET) waveguide configured to guide the reflection light to the eye tracking sensor, and a processor electrically connected to the first light source and the eye tracking sensor, wherein the processor may be configured to control the first light source to emit the display light and track a user's gaze, based on the reflection light detected through the eye tracking sensor.

In accordance with another aspect of the disclosure, an operation method of augmented reality (AR) glasses is provided. The operation method includes emitting display light for displaying an augmented reality image through a first light source, wherein the display light emitted from the first light source may be guided to a display area of a see-through display through a display waveguide, detecting reflection light reflected from the user's eyes through an eye tracking (ET) sensor, wherein the reflection light may be guided to the eye tracking sensor through an eye tracking (ET) waveguide and wherein the display waveguide and the eye tracking waveguide may be included in a glass member of the augmented reality glasses, and tracking a user's gaze, based on the detected reflection light.

According to various embodiments disclosed in this document, a display waveguide may be disposed in one area of a glass member of the AR glasses, and an eye tracking waveguide may be disposed in the lower area of the display waveguide, thereby excluding a separate prism or optical system for the split between the light for display and the light for eye tracking.

According to various embodiments disclosed in this document, a set including a display optical system and an eye tracking optical system of AR glasses is able to be miniaturized.

In addition, various effects recognized directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments, of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
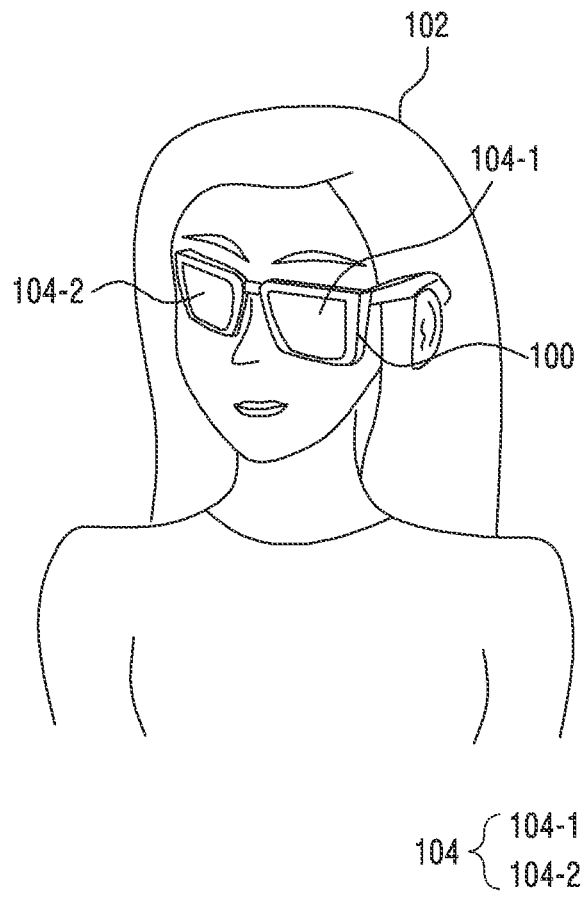
FIG. 1 illustrates augmented reality glasses worn on a user according to an embodiment of the disclosure.

FIG. 1 illustrates augmented reality glasses worn on a user according to an embodiment of the disclosure.

Referring to FIG. 1, augmented reality (AR) glasses 100 may include a wearable electronic device capable of being worn on the user 102. The augmented reality glasses 100 may be one of electronic devices including a near-to-eye display (NED) or a head-mounted display (HMD). The near-to-eye display may be understood as a display in which a display panel is located very close to the eyes of the user 102 so that the user 102 may wear the same as glasses. FIG. 1 illustrates an embodiment in which the user 102 wears augmented reality glasses 100 including a near-to-eye display.

According to an embodiment, the augmented reality glasses 100 may include a see-through display 104 (e.g., a first see-through display 104-1 and a second see-through display 104-2) corresponding to the near-to-eye display. The augmented reality glasses 100 may include the see-through display 104 in at least a portion of glass members. For example, the augmented reality glasses 100 may include a light waveguide in at least a portion of glass members, and one area of the light waveguide may correspond to the see-through display 104. The see-through display 104 may be located very close to the eyes of the user 102, and the user 102 may wear the augmented reality glasses 100 including the see-through display 104 like glasses.

According to an embodiment, the augmented reality glasses 100 may display an augmented reality image through the see-through display 104. The see-through display 104 may transmit light of a real environment (or real object) therethrough. The user 102 may recognize light of the real environment transmitted through the see-through display 104, thereby viewing the real environment. The see-through display 104 may be understood as a transparent display capable of transmitting light of a real object therethrough and displaying an image of a virtual object thereon. For example, the augmented reality glasses 100 may display an image of a virtual object through the see-through display 104. The user 102 may recognize a real object through the see-through display 104 of the augmented reality glasses 100 and recognize a virtual object superimposed thereon. The see-through display 104 may include a transparent material such as glass or plastic.

According to an embodiment, although various embodiments of this document describe the augmented reality glasses 100 in the form of glasses as a main scenario, the disclosure is not limited thereto, and various embodiments of this document may be applied to various electronic devices including a near-to-eye display. For example, various embodiments of this document may also be applied to augmented reality glasses in the form of an HMD device or goggles.

Figure 2:
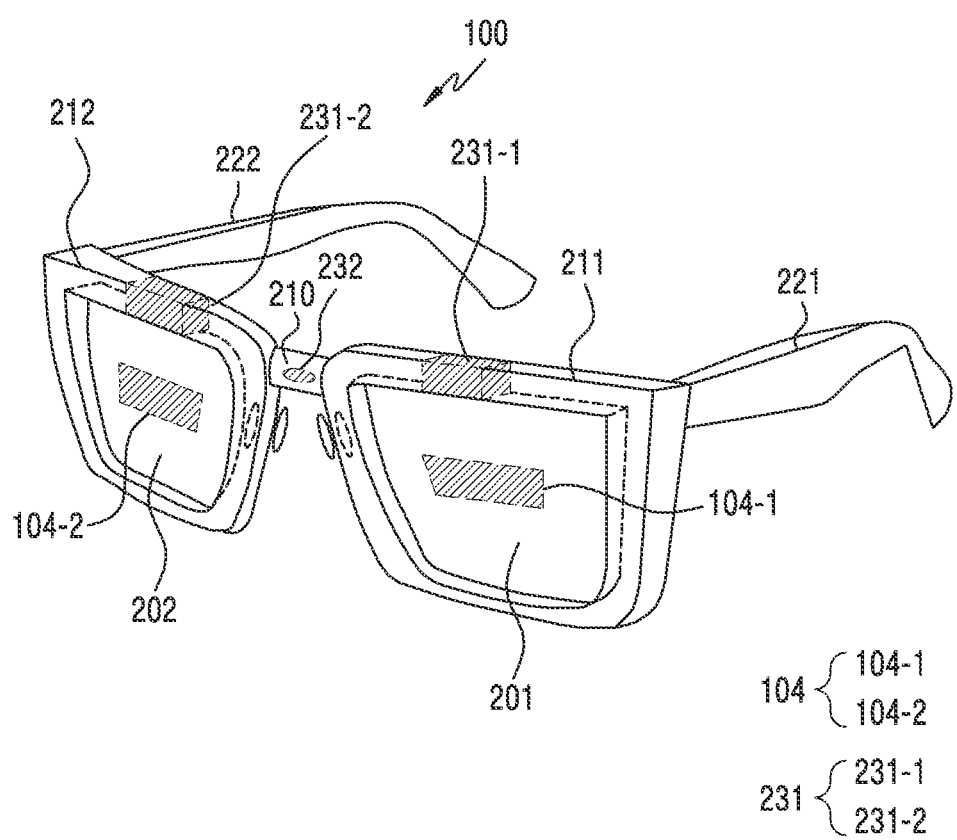
FIG. 2 is a schematic diagram illustrating the augmented reality glasses in FIG. 1 according to an embodiment of the disclosure.

FIG. 2 is a schematic diagram illustrating augmented reality glasses of FIG. 1 according to an embodiment of the disclosure.

Referring to FIG. 2, the augmented reality glasses 100 may include a first glass member 201 including a first see-through display 104-1, a second glass member 202 including a second see-through display 104-2, a connection member 210 connecting the first glass member 201 and the second glass member 202, a first member 211 adjacent to the first glass member 201, a second member 221 extending from the first member 211, a third member 212 adjacent to the second glass member 202, and a fourth member 222 extending from the third member 212. Hereinafter, a duplicate description according to the symmetrical structure of the augmented reality glasses 100 will be omitted.

According to an embodiment, the first glass member 201 and/or the second glass member 202 may be formed of a glass plate or a polymer and may be made transparent or translucent. According to an embodiment, the first member 211, the third member 212, and the connection member 210 may be integrally configured.

According to an embodiment, elements included in the augmented reality glasses 100 may not be limited to those illustrated in FIG. 2. For example, the augmented reality glasses 100 may further include an eye tracking sensor.

According to an embodiment, the eye tracking sensor may detect light reflected from the eyes of the user 102, and the augmented reality glasses 100 may track a gaze of the user 102, based on the light detected through the eye tracking sensor.

According to an embodiment, the eye tracking sensor may be disposed on at least one inner or outer surface of the elements constituting the augmented reality glasses 100. For example, the eye tracking sensor may be disposed on an inner or outer surface of at least one of the connection member 210, the first member 211, the second member 221, the third member 212, or the fourth member 222.

According to an embodiment, the augmented reality glasses 100 may further include an illuminance sensor. The illuminance sensor may detect illuminance (or brightness) around the eyes of the user 102 or the augmented reality glasses 100. The augmented reality glasses 100 may control a first light source and/or a second light source, which will be described later, based on the illuminance (or brightness) sensed by the illuminance sensor.

According to an embodiment, the illuminance sensor may be disposed on at least one inner or outer surface of the elements constituting the augmented reality glasses 100. For example, the illuminance sensor may be disposed on an inner or outer surface of at least one of the connection member 210, the first member 211, the second member 221, the third member 212, or the fourth member 222.

According to an embodiment, the augmented reality glasses 100 may include a self-luminous display (e.g., Micro light-emitting diode (LED) or organic light-emitting diode (OLED)) or a display requiring a separate light source (e.g., liquid crystal on silicon (LcoS), digital micromirror device (DMD), or laser scanning display (LSD)). The self-luminous display may be understood as a display capable of displaying an image by emitting light from the display itself. The display requiring a separate light source may be understood as a display capable of displaying an image by reflecting and emitting light emitted from a separate light source.

According to an embodiment, the display requiring a separate light source may reflect light emitted from the separate light source, and the reflected light may be guided to the eyes of the user 102 through various members (e.g., a polarizer beam splitter, lenses, and a light waveguide).

According to an embodiment, the augmented reality glasses 100 may include a first light source 231 emitting display light. The first light source 231 may be understood as a self-luminous display that emits light from the display itself or a display that reflects and emits light emitted from a separate light source. For example, in the case where the augmented reality glasses 100 include a self-luminous display, the display light may be understood as the light emitted from the self-luminous display itself. As another example, in the case where the augmented reality glasses 100 include a display that requires a separate light source, the display light may also be understood as the light emitted from the display by reflecting the light emitted from the separate light source.

According to an embodiment, the first light source 231 may be disposed on at least one inner or outer surface of the elements constituting the augmented reality glasses 100. For example, the first light source 231 may be disposed on an inner or outer surface of at least one of the connection member 210, the first member 211, the second member 221, the third member 212, or the fourth member 222. As another example, the augmented reality glasses 100 shown in FIG. 2 may include a first left light source 231-1 inside the first member 211 and a first right light source 231-2 inside the third member 212. The left and the right are divided based on the user 102. According to various embodiments, the position of the first light source 231 is not limited to the example illustrated in FIG. 2.

According to an embodiment, a second light source 232 emitting additional light, which is different from the display light emitted from the first light source 231, may be included to enhance the brightness around the eyes of the user 102. The second light source 232 may be understood as a device for increasing the brightness around the augmented reality glasses 100 or around the eyes of the user 102, instead of emitting light corresponding to a display image. For example, the second light source 232 may include a white LED or an infrared LED.

According to an embodiment, the second light source 232 may be disposed on at least one inner or outer surface of the elements constituting the augmented reality glasses 100. For example, the second light source may be disposed on an inner or outer surface of at least one of the connection member 210, the first member 211, the second member 221, the third member 212, or the fourth member 222. According to various embodiments, the number of the second light sources 232 and arrangement positions thereof may vary. For example, the second light source 232 may be disposed on one inner surface of the connection member 210 such that the additional light emitted from the second light source 232 travels to the eyes of the user 102 or the periphery thereof. As another example, the second light source 232 may be disposed on one outer surface of the first member 211 and the third member 212, respectively, such that the additional light emitted from the second light source 232 travels to the eyes of the user 102 or the periphery thereof.

According to an embodiment, the light waveguide may be disposed on each of the first glass member 201 and the second glass member 202. However, the disclosure is not limited thereto. For example, the light waveguide may be disposed on at least one of the first glass member 201 and the second glass member 202. The light waveguide may include a display waveguide corresponding to a path through which the display light emitted from the first light source 231 propagates and an eye tracking waveguide corresponding to a path through which the reflection light reflected from the eyes of the user 102 propagates. The display light may be understood as light emitted from a self-luminous display (e.g., Micro LED or OLED) itself or light emitted from a display (e.g., Lcos, DMD, or LSD) that reflects and emits light emitted from a separate light source. The reflection light may be understood as external light (e.g., light in a real environment) reaching the eyes of the user 102 from the outside (e.g., a real environment) of the augmented reality glasses 100 through the see-through display 104 and/or light that is emitted from the display device, reaches the eyes of the user 102 through the display waveguide, and then reflected therefrom.

According to an embodiment, the first member 211 is not limited to the form shown in FIG. 2. For example, the first member 211 may include a form in which the first member 211 surrounds at least a portion of the circumference of the first glass member 201. This may be applied to the third member 212 in the same manner.

According to an embodiment, the second member 221 is not limited to the form shown in FIG. 2. For example, the second member 221 may include a form capable of being worn on a body part (e.g., the ear or head) of the user 102. This may be applied to the fourth member 222 in the same manner. As another example, the second member 221 may include a form that allows the augmented reality glasses 100 to be worn on the head of the user 102.

According to an embodiment, the connection member 210, the first member 211, the second member 221, the third member 212, and the fourth member 222 may be integrally connected and coupled.

According to an embodiment, the augmented reality glasses 100 may include a first see-through display 104-1 included in the first glass member 201 and a second see-through display 104-2 included in the second glass member 202. The first see-through display 104-1 and the second see-through display 104-2 may include a transparent display capable of transmitting light of a real object and displaying a virtual object image. For example, the user 102 may recognize a real object through the see-through display 104 and recognize the real object and a virtual object images superimposed thereon.

Figure 3:
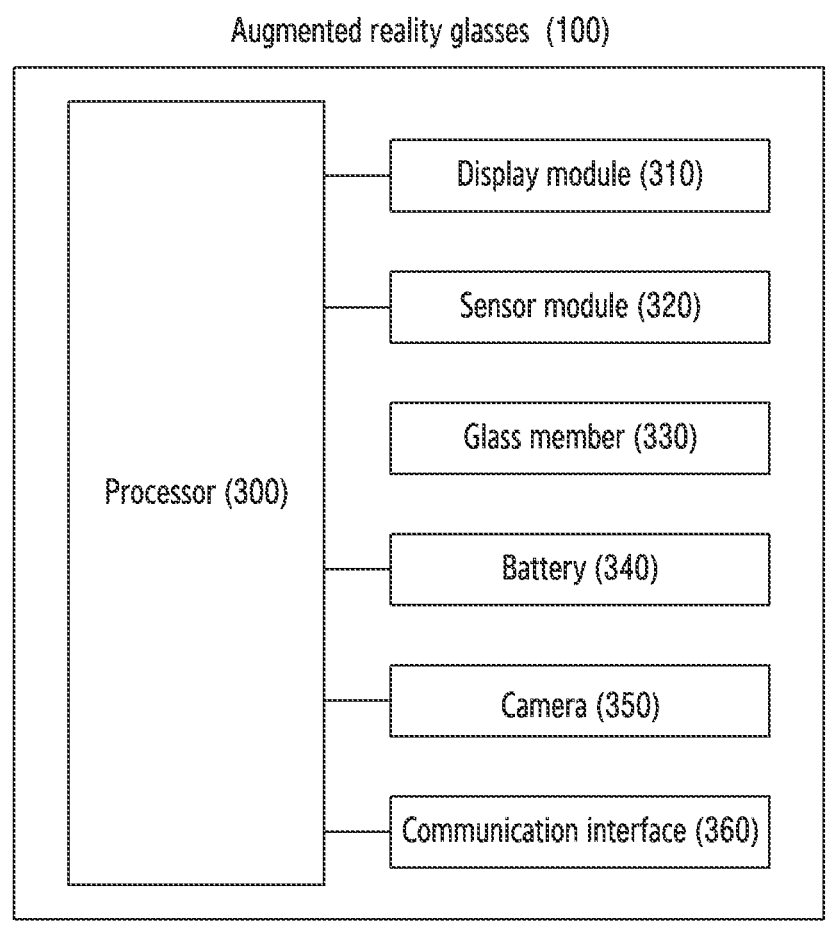
FIG. 3 is a block diagram of augmented reality glasses according to an embodiment of the disclosure.

FIG. 3 is a block diagram of augmented reality glasses according to an embodiment of the disclosure.

Referring to FIG. 3, the augmented reality glasses 100 may include a processor 300, a display module 310, a sensor module 320, a glass member 330, a battery (or power supply device) 340, a camera 350, and a communication interface 360. A module included in the augmented reality glasses 100 may be understood as a hardware module (e.g., a circuit) included in the augmented reality glasses 100. The elements included in the augmented reality glasses 100 may not be limited to the elements (e.g., the display module 310, the sensor module 320, the glass member 330, the battery 340, the camera 350, or the communication interface 360) shown in the block diagram in FIG. 3. The elements of the augmented reality glasses 100 shown in FIG. 3 may be replaced with other elements, or other elements may be further added to the augmented reality glasses 100. For example, the augmented reality glasses 100 may further include an audio module and a memory in addition to the elements shown in FIG. 3. As another example, at least part of the description of the electronic device 1001 shown in FIG. 10 may be included in the augmented reality glasses 100 in FIG. 3.

According to an embodiment, the processor 300 may execute instructions stored in the memory to control the operation of the elements (e.g., the display module 310, the sensor module 320, the battery 340, the camera 350, and the communication interface 360) of the augmented reality glasses 100. The processor 300 may be electrically and/or operatively connected to the display module 310, the sensor module 320, the battery 340, the camera 350, and the communication interface 360. The processor 300 may execute software to control at least one other element (e.g., the display module 310, the sensor module 320, the battery 340, the camera 350, and the communication interface 360) connected to the processor 300. The processor 300 may obtain commands from the elements included in the augmented reality glasses 100, interpret the obtained commands, and process and/or calculate a variety of data according to the interpreted commands.

According to an embodiment, the augmented reality glasses 100 may receive data processed by a processor provided in an external device (e.g., a mobile terminal or the electronic device 1001 in FIG. 10) from the external device. For example, the augmented reality glasses 100 may photograph objects (e.g., real objects or the eyes of the user 102) through the camera 350, transmit the photographed image to an external device through the communication interface 360, and receive data, based on the transmitted image, from the external device. The external device may produce image data related to augmented reality, based on information (e.g., shape, color, or location) of the photographed objects received from the augmented reality glasses 100, and transmit the same to the augmented reality glasses 100. As another example, the augmented reality glasses 100 may request additional information, based on an image obtained by photographing objects (e.g., real objects or the eyes of the user 102) through the camera 350, from an external device and receive the additional information from the external device.

According to an embodiment, the display module 310 may include a first light source 231.

According to an embodiment, the first light source 231 may emit display light for displaying an augmented reality image under the control of the processor 300. The first light source 231 may be understood as a self-luminous display that emits light from the display itself or a display that reflects and emits light emitted from a separate light source. For example, the augmented reality glasses 100 (e.g., the processor 300) may emit display light for displaying an augmented reality image on a display area of the see-through display 104 through the first light source 231. As another example, in response to an input of the user 102, the augmented reality glasses 100 (e.g., the processor 300) may control the first light source 231 in order to display an augmented reality image on the display area of the see-through display 104. The type of input of the user 102 may include a button input, a touch input, a voice input, and/or a gesture input, but it is not limited to, and various input methods capable of controlling the operation of the first light source 231 may be included.

According to an embodiment, the augmented reality glasses 100 may further include a second light source 232, which is different from the first light source 231, as well as the first light source 231. The second light source 232 may emit additional light different from the display light emitted by the first light source 231 to enhance the brightness around the eyes of the user 102. The second light source 232 may include a white LED or an infrared LED.

According to an embodiment, if the ambient illuminance of the augmented reality glasses 100, the amount of display light emitted from the first light source 231, or the amount of reflection light reflected from the eyes of the user 102 is less than or equal to a reference value, the augmented reality glasses 100 may emit additional light toward the eyes of the user 102 through the second light source 232.

According to an embodiment, when the first light source 231 emits display light, the augmented reality glasses 100 may determine whether or not predetermined conditions are satisfied. The predetermined conditions may include a value configured in the augmented reality glasses 100 or a value arbitrarily configured by the user. For example, the predetermined conditions may include whether or not at least one of the ambient illuminance of the augmented reality glasses 100, the amount of display light emitted from the first light source 231, the illuminance value of an image displayed using the first light source 231, the brightness around the eyes of the user 102, or the amount of reflection light reflected from the eyes of the user 102 is equal to or less than a reference value. The ambient illuminance of the augmented reality glasses 100 may be obtained using, for example, an illuminance sensor provided in the augmented reality glasses 100. The illuminance value of an image displayed using the first light source 231 may be obtained by calculating, for example, pixel values of an image frame included in the content to be output by the processor 200 using the first light source 231. The predetermined conditions are not limited to the above-described examples, and may include the state in which the brightness around the eyes of the user 102 is required to increase through the second light source 232 due to low illuminance around the user 102 wearing the augmented reality glasses 100. For example, when a configured time of the augmented reality glasses 100 is evening, the augmented reality glasses 100 may control the second light source 232 to emit additional light toward the eyes of the user 102. The predetermined conditions may be determined by a combination of two or more factors. For example, it is possible to determine whether or not the predetermined conditions are satisfied through a combination of an illuminance value of an image displayed using the first light source 231 and a surrounding illuminance value.

According to an embodiment, the glass member 330 may include at least one of a display waveguide and an eye tracking waveguide.

According to an embodiment, the display waveguide may form a light path by guiding the display light emitted from the first light source 231 to travel to the display area of the see-through display 104. The see-through display 104 may correspond to at least one area of the display waveguide. For example, the area of the see-through display 104 may correspond to an area of the display waveguide through which light propagating inside the display waveguide is emitted and through which external light is transmitted. For example, the see-through display 104 may be disposed at one end of the display waveguide included in the glass member 330.

According to an embodiment, the display waveguide may include at least one of at least one diffractive element or reflective element (e.g., a reflective mirror). The display waveguide may guide the display light emitted from the first light source 231 to the eyes of the user 102 using at least one diffractive element or reflective element included in the display waveguide. For example, the diffractive element may include an IN/OUT grating, and the reflective element may include a total internal reflection (TIR).

According to an embodiment, an optical material (e.g., glass) processed into a wafer shape may be used as the display waveguide, and the display waveguide may have various refractive indexes, for example, from 1.5 to 1.9.

According to an embodiment, the display waveguide may include a display area (e.g., the see-through display 104) through which light traveling inside the waveguide is emitted to the outside through total reflection. The display area may be disposed in a portion of the display waveguide. At least one area of the display waveguide may include the see-through display.

According to an embodiment, the display waveguide may include a material (e.g., glass or plastic) capable of totally reflecting the display light so as to guide the display light to the eyes of the user 102. The material may not be limited to the above-described examples.

According to an embodiment, the display waveguide may separate the display light emitted from the first light source 231 according to wavelengths (e.g., blue, green, or red) such that the separated light travels respectively through separate paths inside the display waveguide.

According to an embodiment, the display waveguide may be disposed on the glass member 330. For example, the glass member 330 may be divided into a lower portion and an upper portion, based on an imaginary axis on which the center point of the glass member 330 and the center point of the eyes of the user 102 match and an imaginary line orthogonal to the imaginary axis at the center point of the glass member 330, and the display waveguide may be disposed in the upper portion of the glass member 330. As another example, in the upper portion and the lower portion of the glass member 330, the display waveguide may be disposed over an area from the imaginary line to a point corresponding to a third therefrom in the lower direction. The area in which the display waveguide is disposed may not be limited to the above-described area of the glass member 330, and the area in which the display waveguide is disposed may include any area of the glass member 330 in which the amount of light reflected by the eyes of the user 102 is greater than or equal to a reference value.

According to an embodiment, the sensor module 320 may include at least one sensor (e.g., an eye tracking sensor and/or an illuminance sensor). The at least one sensor may not be limited to the above-described examples. For example, the at least one sensor may further include a proximity sensor or a tactile sensor capable of detecting whether or not the user 102 is wearing the augmented reality glasses 100. The augmented reality glasses 100 may detect whether or not the user 102 is wearing the augmented reality glasses 100 through the proximity sensor or the tactile sensor. If it is detected that the user 102 is wearing the augmented reality glasses 100, the augmented reality glasses 100 may manually and/or automatically pair with another electronic device (e.g., a smartphone).

According to an embodiment, the at least one sensor may be disposed on at least one inner or outer surface of the elements of the augmented reality glasses 100. For example, the at least one sensor may be disposed on an inner or outer surface of the first member 211 adjacent to the glass member 330. The first member 211 may be adjacent to the glass member 330, and may be understood as a frame of the augmented reality glasses 100. For example, the at least one sensor may be disposed on one inner or outer surface of the eyeglass frame corresponding to the first member 211. As another example, the at least one sensor may be disposed on an inner or outer surface of the second member 221 extending from the first member 211. The second member 221 may be understood as a temple of the augmented reality glasses 100 supported on the ear of the user 102. For example, the at least one sensor may be disposed on an inner or outer surface of the temple corresponding to the second member 221.

According to an embodiment, the eye tracking sensor may detect the reflection light reflected from the eyes of the user 102 under the control of the processor 300. The augmented reality glasses 100 may convert the reflection light detected through the eye tracking sensor into an electrical signal. The augmented reality glasses 100 may obtain an eye image of the user 102 through the converted electrical signal. The augmented reality glasses 100 may track a gaze of the user 102 using the obtained eye image of the user 102.

According to an embodiment, the eye tracking module may include the eye tracking sensor, and the eye tracking module may capture an eye image of the user 102 using the reflection light detected through the eye tracking sensor. The eye tracking module may detect the reflection light of the user 102 under the control of the processor 300 and track a gaze of the user 102, based on the position and movement of the detected reflection light. The eye tracking module will be described in detail with reference to FIG. 5.

According to an embodiment, the processor 300 may track a gaze of the user 102, based on the reflection light detected through the eye tracking sensor. For example, the processor 300 may determine the position of a pupil by analyzing the eye image of the user 102 captured using the eye tracking sensor. The processor 300 may determine a gaze direction of the user 102 according to the determined position of the pupil. However, this is only an example of a method of tracking a user's gaze using the eye tracking sensor and the disclosure is not limited thereto.

According to an embodiment, based on the control of the processor 300, the illuminance sensor may detect the ambient illuminance (or brightness) of the augmented reality glasses 100, the amount of display light emitted from the first light source, the brightness around the eyes of the user 102, or the amount of reflection light reflected from the eyes of the user 102. The augmented reality glasses 100 may determine whether or not to operate the second light source 232, based on the illuminance (or brightness) or the amount of light detected through the illuminance sensor. For example, if the illuminance (or brightness) around the user 102 wearing the augmented reality glasses 100 is less than or equal to a reference value, the augmented reality glasses 100 may determine to operate the second light source 232 and emit additional light toward the eyes of the user 102 through the second light source 232. As another example, if the brightness around the eyes of the user 102 wearing the augmented reality glasses 100 is less than or equal to a reference value, the augmented reality glasses 100 may determine to operate the second light source 232 and emit additional light toward the eyes of the user 102 through the second light source 232. As another example, if the amount of reflection light from the eyes of the user 102 is equal to or less than a reference value, the augmented reality glasses 100 may determine to operate the second light source 232 and emit additional light toward the eyes of the user 102 through the second light source 232.

According to an embodiment, the augmented reality glasses 100 may detect the illuminance (or brightness) around the user 102 through the illuminance sensor. The augmented reality glasses 100 may adjust the amount of light (or brightness) of a display (e.g., the first light source 231), based on the detected illuminance (or brightness).

According to an embodiment, a sensing value of the illuminance sensor may vary depending on the position where the illuminance sensor is disposed on the augmented reality glasses 100 or the position where the illuminance sensor receives the illuminance (or brightness). The various sensing values may be reflected in the amount of light (or brightness) of the display of the augmented reality glasses 100. The augmented reality glasses 100 may adjust the amount of light (or brightness) of the display by reflecting various sensing values of the illuminance sensor. According to an embodiment, the augmented reality glasses 100 may include a plurality of the illuminance sensors. For example, each illuminance sensor may be disposed on an outer surface and an inner surface of the augmented reality glasses 100.

According to an embodiment, the glass member 330 may include at least one of a display waveguide and an eye tracking waveguide.

According to an embodiment, the eye tracking waveguide may form a path of light by guiding reflection light reflected from the eyes of the user 102 to the sensor module 320. The eye tracking waveguide may be used to transmit the reflection light to the eye tracking sensor.

According to an embodiment, the eye tracking waveguide may be configured as the same or different elements as or from the display waveguide.

According to an embodiment, the eye tracking waveguide may include at least one of at least one diffractive element or reflective element (e.g., a reflective mirror). The eye tracking waveguide may guide the display light to the eye tracking sensor using at least one diffractive element or reflective element included in the eye tracking waveguide. For example, the diffractive element may include an IN/OUT grating, and the reflective element may include a TIR. The eye tracking waveguide may condense the reflection light through the IN grating and emit the reflection light through the OUT grating. The eye tracking waveguide may totally reflect the reflection light inside the waveguide through the TIR. The reflection light may include the external light reaching the eyes of the user 102 from the outside of the augmented reality glasses 100 through the see-through display 104 and/or the reflected display light for displaying an augmented reality image.

According to an embodiment, the eye tracking waveguide may include an area through which light travelling inside the eye tracking waveguide is emitted to the outside through total reflection. The light emitted through the area may travel to the eye tracking sensor.

According to an embodiment, the eye tracking waveguide may include a material (e.g., glass or plastic) capable of totally reflecting the light so that the reflection light is guided to the sensor module 320. The material may not be limited to the above-described examples.

According to an embodiment, the eye tracking waveguide may be disposed on the glass member 330. For example, the glass member 330 may be divided into a lower portion and an upper portion, based on an imaginary axis on which the center point of the glass member 330 and the center point of the eyes of the user 102 match and an imaginary line orthogonal to the imaginary axis at the center point of the glass member 330, and the eye tracking waveguide may be disposed in the lower portion of the glass member 330. As another example, the eye tracking waveguide may be disposed below the display waveguide. The eye tracking waveguide and the display waveguide may be disposed on the glass member 330 so as not to overlap each other. As another example, in the lower portion of the glass member 330, the eye tracking waveguide may be disposed over an area excluding the area from the imaginary line to a point corresponding to a third therefrom in the lower direction. The area in which the eye tracking waveguide is disposed may not be limited to the above-described area of the glass member 330, and the area in which the eye tracking waveguide is disposed may include any area of the glass member 330 in which the eye tracking sensor detects the amount of reflection light condensed by the eye tracking waveguide to be greater than or equal to a configured value.

According to an embodiment, the display waveguide and the eye tracking waveguide of the augmented reality glasses 100 may be disposed on the glass member 330. For example, the glass member 330 (e.g., the first glass member 201 and/or the second glass member 202 in FIG. 2) may include the display waveguide and the eye tracking waveguide. The material of the glass member 330 may include glass or plastic. Materials of the display waveguide and the eye tracking waveguide may be the same as or different from that of the glass member 330.

According to an embodiment, the battery 340 may supply power to at least one element of the augmented reality glasses 100. The battery 340 may be connected to an external power source in a wired or wireless manner to be charged.

According to an embodiment, the camera 350 may capture images around the augmented reality glasses 100. For example, the camera 350 may capture an eye image of the user 102 or a real object image outside the augmented reality glasses 100.

According to an embodiment, the communication interface 360 may include a wired interface or a wireless interface. The communication interface 360 may support performing direct communication (e.g., wired communication) or indirect communication (e.g., wireless communication) between the augmented reality glasses 100 and an external device (e.g., a mobile terminal, the electronic device 1001 in FIG. 10, the electronic device 1002 in FIG. 10, or the electronic device 1004 in FIG. 10). At least some of the description of the electronic device 1001 illustrated in FIG. 10 may be included in the external device.

Figure 4:
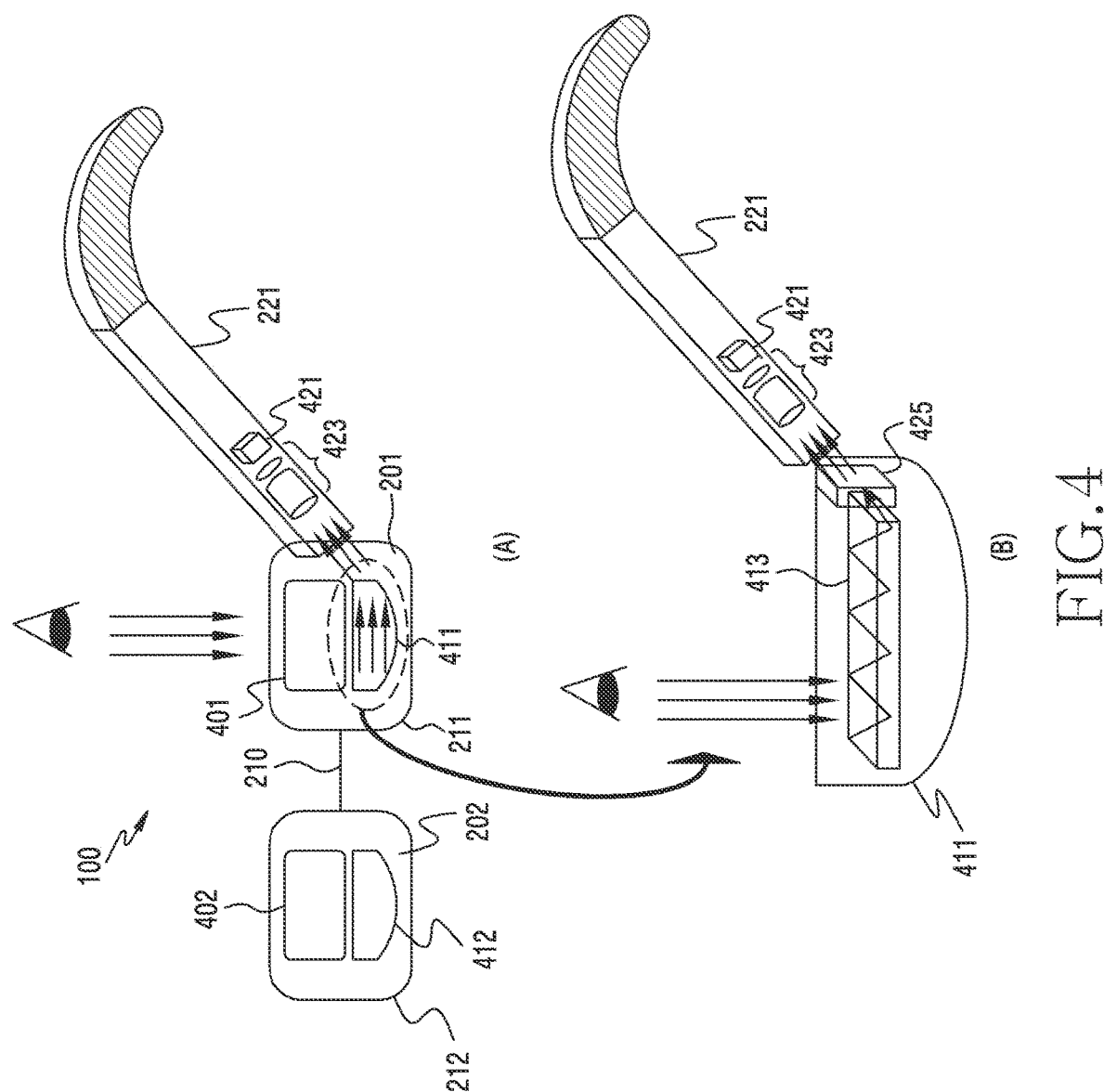
FIG. 4 illustrates augmented reality glasses for guiding light reflected by user's eyes to an eye tracking sensor through an eye tracking waveguide according to an embodiment of the disclosure.

FIG. 4 illustrates augmented reality glasses for guiding light reflected from the eyes of the user to an eye tracking sensor through an eye tracking waveguide according to an embodiment of the disclosure.

Part (A) in FIG. 4 illustrates a path through which reflection light reflected from the eyes of the user 102 is guided to the eye tracking sensor 421 through a second area 411 of the augmented reality glasses 100, and part (B) in FIG. 4 illustrates the configurations disposed in the second area 411 and a path thereof in detail.

Referring to part (A) of FIG. 4, the augmented reality glasses 100 may include a first glass member 201, a second glass member 202, a first area 401, a second area 411, a third area 402, a fourth area 412, a first member 211, a second member 221, a third member 212, a connection member 210, a focus lens 423, and an eye tracking sensor 421. Although not shown in FIG. 4, as shown in FIG. 2, the fourth member 222 and extending from the third member 212 of the augmented reality glasses 100 and other elements (e.g., the elements in FIG. 3) may be further included.

According to an embodiment, the first area 401 and the third area 402 may include a display waveguide, respectively. The display waveguide will be described in detail with reference to FIG. 5.

According to an embodiment, the augmented reality glasses 100 may obtain reflection light reflected from the eyes of the user 102 through the second area 411. The obtained reflection light may travel from the second area 411 to the eye tracking sensor 421 through a focus lens 423 disposed on the second member 221. The focus lens 423 may be understood as the eye tracking (ET) optic 531 and the lens 532 shown in FIGS. 5 and 6.

According to an embodiment, the augmented reality glasses 100 may detect the reflection light through the eye tracking sensor 421. The augmented reality glasses 100 may track a gaze of the user 102, based on the detected reflection light.

Referring to part (B) of FIG. 4, the second area 411 may include an eye tracking waveguide 413 and a total-reflection mirror 425. The total-reflection mirror 425 may be replaced with a prism. The eye tracking waveguide 413 may be disposed in the second area 411. The eye tracking waveguide 413 may include a splitter that condenses reflection light reflected from the eyes of the user 102. The eye tracking waveguide 413 may include at least one of one or more diffractive elements or reflective elements (e.g., reflective mirrors) such that the condensed reflection light travels into or out of the waveguide. For example, the eye tracking waveguide 413 may include an IN/OUT grating corresponding to the diffractive element and a total reflection (TIR) corresponding to the reflective element. The augmented reality glasses 100 may condense the reflection light into the eye tracking waveguide 413 through the IN grating. The augmented reality glasses 100 may emit the reflection light to the outside of the eye tracking waveguide 413 through the OUT grating. The augmented reality glasses 100 may totally reflect the reflection light through the TIR in the eye tracking waveguide 413.

According to an embodiment, the augmented reality glasses 100 may condense the reflection light on the eye tracking waveguide 413 included in the second area 411 through the IN grating. The reflection light may be totally reflected inside the eye tracking waveguide 413 using the TIR. The reflection light propagated using the total reflection may change in the path thereof through the total-reflection mirror 425. The reflection light whose path has been changed may be guided to the eye tracking sensor 421.

According to various embodiments, the position, length, and/or shape of the second area 411 and/or the eye tracking waveguide 413 may be variously configured based on the position of the eye tracking sensor 421. For example, if the first glass member 201 in which the second area 411 is located is not adjacent to the second member 221 in which the eye tracking sensor 421 is located, the second area 411 may include a plurality of areas.

Although not shown, in the case where the augmented reality glasses 100 include a plurality of eye tracking sensors 421, the second glass member 202 may include a structure similar to that of the first glass member 201, and the fourth member 222 extending from third member 212 may include a structure similar to that of the second member 221.

Figure 5:
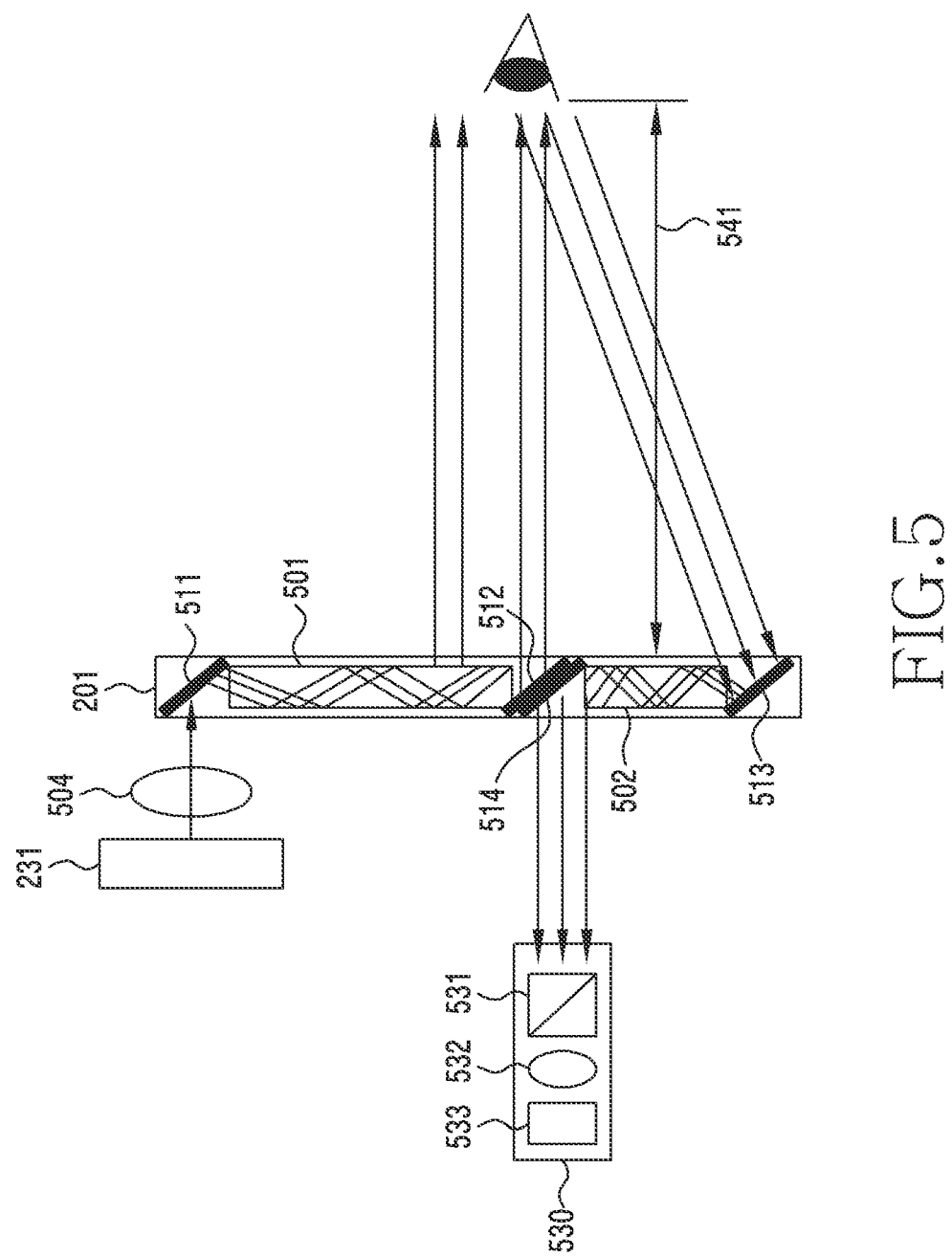
FIG. 5 illustrates an optical path through which light travels in augmented reality glasses according to an embodiment of the disclosure.

FIG. 5 illustrates an optical path through which light travels in augmented reality glasses according to an embodiment of the disclosure.

Referring to FIG. 5, the display light emitted from the first light source 231 may pass through light waveguides (e.g., a display waveguide 501 and an eye tracking waveguide 502) included in the first glass member 201 to be guided to an eye tracking module 530. In addition, the light incident from the outside of the augmented reality glasses 100, rather than the light emitted from the first light source 231, may be guided to the eyes of the user 102 through the first glass member 201. For example, external light (e.g., light reflected from real objects) incident from the outside of the augmented reality glasses 100 may pass through a display waveguide 501 (or the see-through display 104 of the display waveguide 501) included in the first glass member 201 to be guided to the eye of the user 102.

According to an embodiment, FIG. 5 shows an optical path through which light travels through the first glass member 201 from a side view, which may be equally applied to an optical path through which light travels through the second glass member 202. According to various embodiments, elements (e.g., a display waveguide 501, a first splitter 511, or a second splitter 512) of the augmented reality glasses 100 may have the same function depending on the position of the first light source 231, but the position or length of the path through which the light travels may be different depending thereon.

According to an embodiment, the augmented reality glasses 100 may include a display waveguide 501, an eye tracking waveguide 502, a first light source 231, a projection lens 504, a first splitter 511, a second splitter 512, a third splitter 513, a fourth splitter 514, and an eye tracking module 530.

According to an embodiment, the display waveguide 501 and the eye tracking waveguide 502 may be made of glass or polymer forming a grating structure and may include a waveguide structure using the grating structure. The grid structure may include protrusions or inclined surfaces in various shapes.

According to an embodiment, the first light source 231 may be understood as a display device (e.g., a self-luminous display) that emits display light for displaying an augmented reality image or a device that emits reflection light such that the display reflects light to emit display light.

According to an embodiment, the first light source 231 may emit display light for displaying an augmented reality image or emit reflection light to the display such that the display emits display light under the control of the processor 300. The display light or reflection light emitted from the first light source 231 may be guided to the display waveguide 501 through the projection lens 504 and the first splitter 511.

According to an embodiment, the display waveguide 501 and the eye tracking waveguide 502 may be made of glass or polymer and include a nanopattern, for example, a polygonal or curved lattice structure (grating structure), formed on an inner or outer surface thereof. According to an embodiment, light incident on one end of the display waveguide 501 may be propagated inside the display waveguide 501 by the nano-pattern. The display waveguide 501 may receive an image (or light produced by the image) from the first light source 231 and transmit the same in the longitudinal direction (L) or the width direction (W) of the display waveguide 501.

According to an embodiment, the projection lens 504 may condense the display light emitted from the first light source 231. For example, the projection lens 504 may be a condenser lens. The projection lens 504 may be disposed to guide the display light emitted from the first light source 231 to the display waveguide 501 through the first splitter 511. The display light condensed by the projection lens 504 may be guided to the display waveguide 501 through the first splitter 511. The first splitter 511 may be disposed to guide the display light passing through the projection lens 504 to the display waveguide 501.

According to an embodiment, the splitters 511, 512, 513, and 514 may reflect light to change the path thereof. The splitters 511, 512, 513, and 514 may be disposed as elements of the augmented reality glasses 100 to change the path of light.

According to an embodiment, the first splitter 511 may be disposed at one end of the display waveguide 501 to guide the display light emitted from the first light source 231 to the display waveguide 501.

According to an embodiment, the second splitter 512 may be disposed at one end of the display waveguide 501 to guide the display light emitted from the first light source 231 and guided by the display waveguide 501 to the eye of the user 102.

According to an embodiment, the third splitter 513 may be disposed at one end of the eye tracking waveguide 502 to guide the reflection light reflected from the eye of the user 102 to the eye tracking waveguide 502.

According to an embodiment, the fourth splitter 514 may be disposed at one end of the eye tracking waveguide 502 to guide the reflection light guided by the eye tracking waveguide 502 and reflected from the eye of the user 102 to the eye tracking module 530.

According to an embodiment, the fourth splitter 514 may share one surface of the second splitter 512 or may be provided separately.

According to an embodiment, the eye tracking module 530 may include an ET optic 531, a lens 532, and/or an eye tracking sensor 533. The elements of the eye tracking module 530 may not be limited to the elements shown in FIG. 5. For example, the eye tracking module 530 may further include the elements shown in FIG. 6.

According to an embodiment, the ET optic 531 may change the path of the reflection light passing through the eye tracking waveguide 502 and emitted therefrom or guide the same. The ET optic 531 may be disposed to guide the reflection light passing through the eye tracking waveguide 502 and emitted therefrom to the eye tracking sensor 533.

According to an embodiment, the lens 532 may condense the reflection light changed or guided by the ET optic 531. The lens 532 may be disposed such that the changed or guided light travels to the eye tracking sensor 533.

According to an embodiment, the eye tracking sensor 533 may detect the reflection light that is condensed by the lens 532 and reflected from the eye of the user 102. For example, the eye tracking sensor 533 may detect the reflection light passing through the eye tracking waveguide and 502 emitted through the fourth splitter 514. The eye tracking sensor 533 may be disposed to detect reflection light passing through the ET optic 531 and the lens 532.

According to an embodiment, the position where the eye tracking module 530 is disposed may not be limited to the position shown in FIG. 5. For example, the eye tracking module 530 may be disposed between the first glass member 201 and the eye of the user 102.

According to an embodiment, the eye relief 541 may be understood as the distance from the eye of the user 102 to the eye tracking waveguide 502, and an eye box may be understood as a specific area (not shown) in which the display light emitted through the display waveguide 501 is produced based on the eye of the user 102. The area of the eye box may be formed based on the intensity of light emitted through the display waveguide 501, and a criterion for usability related to screen display may be used to determine the size of the eye box. For example, the eye box may be formed in an area corresponding to 100% to 80% of the light intensity. The eye relief 541 and the eye box may be used to determine the arrangement angles and/or positions of the splitters 511, 512, 513, and 514.

Figure 6:
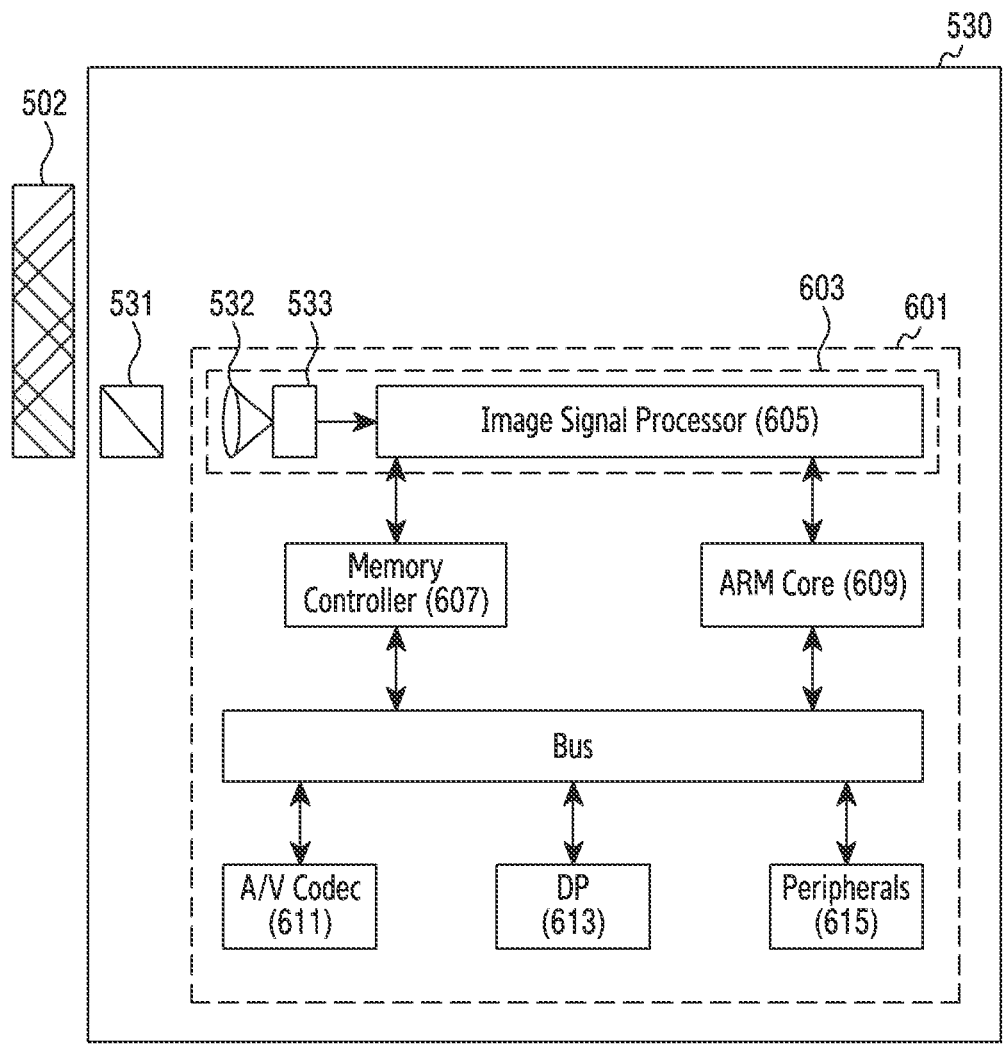
FIG. 6 is a block diagram of an eye tracking module according to an embodiment of the disclosure.

FIG. 6 is a block diagram of an eye tracking module according to an embodiment of the disclosure.

Referring to FIG. 6, the eye tracking module 530 may include an ET optic 531, a lens 532, an eye tracking sensor 533, an image signal processor (ISP) 605, a memory controller 607, an advanced reduced instruction set computer (RISC) machines (ARM) core 609, an audio/video (A/V) codec 611, a display processor (DP) 613, and peripherals 615. According to an embodiment, the eye tracking module 530 is not limited to the configuration shown in FIG. 6. For example, the eye tracking module 530 may further include an eye tracking optical system. The eye tracking optical system may be understood as an optical system for transmitting the light emitted through the eye tracking waveguide 502 to the lens 532. According to an embodiment, an ET camera 603 may include a lens 532, an eye tracking sensor 533, and an image signal processor 605. The ET camera 603 may detect the light passing through and guided by the eye tracking waveguide 502 and process the same into an image. According to an embodiment, an application processor (AP) 601 may include an ET camera 603, a memory controller 607, an ARM core 609, an audio/video codec 611, a display processor 613, and peripherals 615. The elements of the AP 601 are not limited to the configuration shown in FIG. 6. For example, the AP 601 may further include an image sensor interface and a group update program (GUP)/GUP. According to an embodiment, the memory controller 607, the ARM core 609, the audio/video codec 611, the display processor (DP) 613, and the peripheral device 615 may be operatively and/or electrically connected through a bus.

According to an embodiment, the reflection light reflected from the eye of the user 102 may be emitted via the eye tracking waveguide 502 and pass through the ET optic 531 and the lens 532 to be guided to the eye tracking sensor 533. The eye tracking sensor 533 may detect reflection light reflected from the eye of the user 102 and convert the reflection light into electrical energy (hereinafter, an "image signal") by photoelectric transformation. The eye tracking sensor 533 may provide the converted image signal to the image signal processor 605.

According to an embodiment, the image signal processor 605 may process the image signal provided from the eye tracking sensor 533 to be suitable for eye tracking detection. The image processing includes adjusting brightness, color, or sharpness of the image signal to be suitable for eye tracking detection, which is called "white balance." The image-processed image signal may be stored in the memory controller 607. The ARM core 609 may extract feature points of the pupil of the user 102 from the image signal stored in the memory controller 607 to detect the position of the eye. The augmented reality glasses 100 may compare the extracted feature points with the detected eye position, thereby tracking a gaze of the user 102. The detected eye position information may be provided to the display processor 613. An image (e.g., a pointer) related to the detected eye position may be provided to the display processor 613 and synthesized with an augmented reality image. The augmented reality glasses 100 may emit light of the augmented reality image with which the image related to the eye position is synthesized to the display waveguide 501 through the first light source 231. The light of the synthesized augmented reality image may be guided to the eye of the user 102 through the display waveguide 501. For example, the user 102 may recognize the light of the augmented reality image with which the image related to the eye position is synthesized, which is emitted from the display waveguide 501, and recognize the position or trajectory of the eye of the user 102 according thereto. The audio/video codec 611 may encode or decode the image signal. The peripherals 615 may include a serial peripheral interface (SPI) or a universal serial bus (USB).

Figure 7:
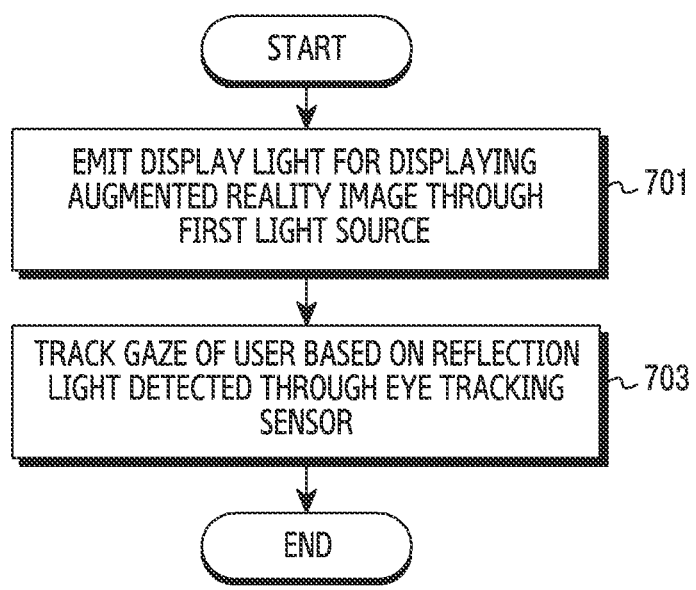
FIG. 7 is a flowchart illustrating an operation method of augmented reality glasses for tracking a user's gaze according to an embodiment of the disclosure.

FIG. 7 is a flowchart illustrating an operation method of augmented reality glasses for tracking a gaze of the user according to an embodiment of the disclosure.

A series of operations described below may be simultaneously performed by the augmented reality glasses 100 or performed in a different sequence, and some of the operations may be omitted or other operations may be added thereto.

Referring to FIG. 7, the augmented reality glasses 100 may emit display light through the first light source 231, and the emitted display light may be reflected from the eyes of the user 102. In addition, the reflected light may be guided to the eye tracking sensor 533, and the augmented reality glasses 100 may track a gaze of the user 102, based on the reflection light detected by the eye tracking sensor 533.

In operation 701 according to an embodiment, the augmented reality glasses 100 may emit display light for displaying an augmented reality image through the first light source 231. The first light source 231 may be understood as a display device (e.g., a self-luminous display) that emits light of a display image or a display device that reflects light emitted from a separate light source and emits light of a display image. For example, the augmented reality glasses 100 may emit light for displaying a virtual object through the first light source 231.

According to an embodiment, in response to an input of the user 102, the augmented reality glasses 100 may control the first light source 231 to emit display light. For example, in response to an input of the user 102 who reproduces augmented reality content including an augmented reality image, the augmented reality glasses 100 may control the first light source 231 to emit light of the augmented reality content.

In operation 703 according to an embodiment, the augmented reality glasses 100 may track a gaze of the user 102, based on the reflection light detected through the eye tracking sensor 533. The augmented reality glasses 100 may capture an eye image of the user 102, based on the detected reflection light through the eye tracking module 530. The augmented reality glasses 100 may extract feature points of the eye image to detect the position of the gaze of the user 102. The augmented reality glasses 100 may compare the extracted feature points with the detected eye position, thereby tracking the gaze of the user 102. The reflection light may include external light reaching the eye of the user 102 from the outside of the augmented reality glasses 100 and/or reflected display light for displaying an augmented reality image.

According to an embodiment, the augmented reality glasses 100 may condense the reflection light through the third splitter 513 disposed at one end of the eye tracking waveguide 502, among a plurality of splitters. The condensed reflection light may be propagated through the eye tracking waveguide 502.

According to an embodiment, the augmented reality glasses 100 may emit the reflection light, emitted from the eye tracking waveguide 502, to one surface of the glass member 330 through the fourth splitter 514 at the opposite end of the eye tracking waveguide 502, among the splitters. The emitted reflection light may be guided to the eye tracking sensor 533.

According to an embodiment, the path of the emitted reflection light may be changed by at least one diffractive element or reflective element (e.g., a total-reflection mirror). The reflection light whose path was changed may be guided to the eye tracking sensor 533.

According to an embodiment, in the case where the eye tracking sensor 533 is disposed on one inner or outer surface of the second member 221 of the augmented reality glasses 100, the reflection light emitted from the eye tracking waveguide 502 may be guided to the eye tracking sensor 533, based on the light path changed by the total-reflection mirror or a prism. The second member 221 may be understood as a temple of the augmented reality glasses 100 supported on the ear of the user 102.

According to an embodiment, in the case where the eye tracking sensor 533 is disposed on one inner or outer surface of the first member 211 of the augmented reality glasses 100, the reflection light emitted from the eye tracking waveguide 502 may be guided to the eye tracking sensor 533 without passing through the total-reflection mirror or the prism. The first member 211 may be understood as a temple of the augmented reality glasses 100 adjacent to the glass member 330.

According to an embodiment, the augmented reality glasses 100 may emit additional light through the second light source 232, and the operation in which the augmented reality glasses 100 emits the additional light through the second light source 232 will be described in detail with reference to FIGS. 8 and 9.

Figure 8:
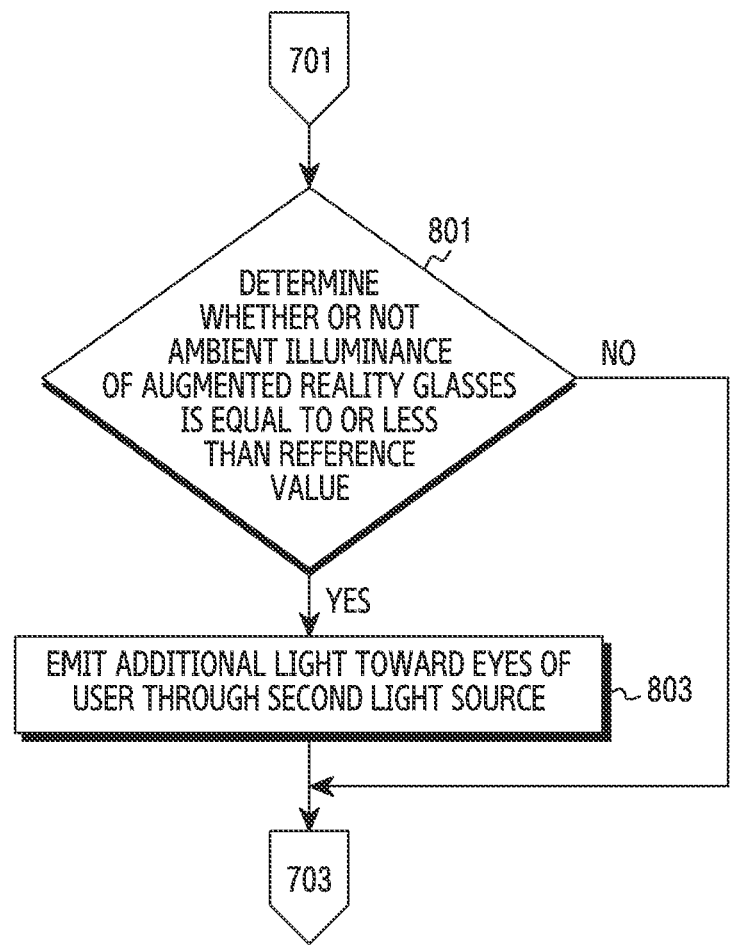
FIG. 8 is a flowchart illustrating an operation method of augmented reality glasses depending on ambient illuminance of the augmented reality glasses according to an embodiment of the disclosure.

FIG. 8 is a flowchart illustrating an operation method of augmented reality glasses depending on ambient illuminance of the augmented reality glasses according to an embodiment of the disclosure.

Referring to FIG. 8, the augmented reality glasses 100 may further emit additional light toward the eyes of the user 102 or the periphery thereof through the second light source 232 while emitting display light through the first light source 231.

According to an embodiment, the first light source 231, the second light source 232, and the illuminance sensor may be operatively and/or electrically connected to each other. For example, the augmented reality glasses 100 may adjust the illuminance (or brightness) of the light emitted through the first light source 231, based on the brightness detected by the illuminance sensor.

According to an embodiment, the augmented reality glasses 100 may emit additional light toward the eyes of the user 102 through the second light source 232, based on the ambient illuminance (or brightness) of the augmented reality glasses 100. For example, if the ambient brightness of the augmented reality glasses 100 is less than or equal to a reference value, the augmented reality glasses 100 may emit additional light toward the eyes of the user 102 or the periphery thereof through the second light source 232. The amount (or brightness) of the additional light may include a light amount (or brightness) at which the brightness around the eyes of the user 102 is equal to or greater than the reference value. The second light source 232 may be disposed on one inner or outer surface of the augmented reality glasses 100 such that the light emitted therefrom travels to the eyes of the user 102 or the periphery thereof. For example, in the augmented reality glasses 100, the lens of the second light source 232 may be exposed through an opening (not shown) of the connection member 210, and the second light source 232 may be disposed on one inner surface of the connection member 210 such that the light emitted through the lens travels to the eyes of user 102 or the periphery thereof. In operation 801 according to an embodiment, the augmented reality glasses 100 may determine whether or not the ambient illuminance (or brightness) of the augmented reality glasses 100 is equal to or less than a reference value. The reference value may include a value configured in the augmented reality glasses 100 or a value configured by the user 102. The ambient range may encompass a range of distance in which the amount of reflection light reflected by the eyes of the user 102 is affected thereby.

According to an embodiment, the augmented reality glasses 100 may detect the ambient illuminance of the augmented reality glasses 100 through the illuminance sensor. The augmented reality glasses 100 may compare the detected illuminance with a reference value. The augmented reality glasses 100 may determine whether the detected illuminance is less than or equal to, or greater than or equal to the reference value, based on the comparison result.

According to an embodiment, if the detected illuminance is less than or equal to the reference value, the augmented reality glasses 100 may perform operation 803, and if the detected illuminance is greater than or equal to the reference value, the augmented reality glasses 100 may perform operation 703.

According to an embodiment, when the detected illuminance is greater than or equal to the reference value, the augmented reality glasses 100 may track a gaze of the user 102, based on the reflection light detected through the eye tracking sensor 533, instead of emitting additional light through the second light source 232.

In operation 803 according to an embodiment, based on determining that the detected illuminance is less than or equal to the reference value, the augmented reality glasses 100 may emit additional light toward the eyes of the user 102 through the second light source 232. If the detected illuminance is less than or equal to the reference value, the second light source 232 may emit additional light to compensate for the detected illuminance and include a white LED or an infrared LED.

According to an embodiment, the display light emitted from the first light source 231, the external light incident on the eyes of the user 102 from the outside of the augmented reality glasses 100 through the see-through display 140, and the additional light emitted from the second light source 232 may be reflected from the eyes of the user 102, and the augmented reality glasses 100 may track the gaze of the user 102, based on the reflection light detected through the eye tracking sensor 533.

According to an embodiment, the augmented reality glasses 100 may obtain an eye image of the user 102, based on the detected reflection light, and detect a gaze position of the user by extracting feature points of the eyes. The augmented reality glasses 100 may track the gaze of the user 102 by comparing the extracted feature points with the detected eye position.

Figure 9:
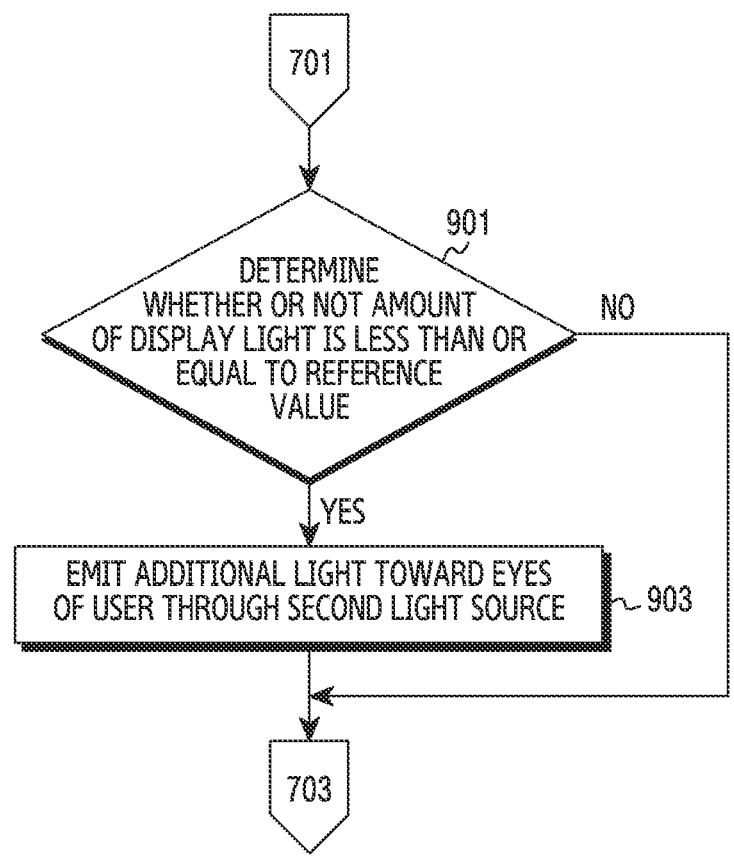
FIG. 9 is a flowchart illustrating an operation method of augmented reality glasses depending on the amount of display light according to an embodiment of the disclosure.

FIG. 9 is a flowchart illustrating an operation method of augmented reality glasses depending on the amount of display light according to an embodiment of the disclosure.

Referring to FIG. 9, the augmented reality glasses 100 may further emit additional light toward the eyes of the user 102 or the periphery thereof through the second light source 232 while emitting display light through the first light source 231. Hereinafter, a redundant description described with reference to FIG. 8 will be omitted.

According to an embodiment, in operation 901, the augmented reality glasses 100 may determine whether or not the amount of display light emitted from the first light source 231 is less than or equal to a reference value.

According to an embodiment, the augmented reality glasses 100 may detect the amount (or brightness) of the display light through the illuminance sensor. The augmented reality glasses 100 may compare the detected amount of light with a reference value. The augmented reality glasses 100 may determine whether the detected amount of light is less than or equal to, or greater than or equal to the reference value, based on the comparison result.

According to an embodiment, if the detected amount of light is less than or equal to the reference value, the augmented reality glasses 100 may perform operation 903, and if the detected amount of light is greater than or equal to the reference value, the augmented reality glasses 100 may perform operation 703.

According to an embodiment, when the detected amount of light is greater than or equal to the reference value, the augmented reality glasses 100 may track a gaze of the user 102, based on the reflection light detected through the eye tracking sensor 533, instead of emitting additional light through the second light source 232.

In operation 903 according to an embodiment, based on determining that the detected amount of light is less than or equal to the reference value, the augmented reality glasses 100 may emit additional light toward the eyes of the user 102 through the second light source 232. The second light source 232 may emit additional light to compensate for the amount of light less than or equal to the reference value.

According to an embodiment, the display light incident on the eye of the user 102, the external light, and the additional light emitted from the second light source 232 may be reflected from the eye of the user 102, and the augmented reality glasses 100 may track the gaze of the user 102, based on the reflection light detected by the eye tracking sensor 533.

Although not shown in FIG. 8 or 9, according to various embodiments, a condition for emitting additional light toward the eyes of the user 102 through the second light source 232 may be based on the brightness around the eyes of the user 102 or the amount of reflection light reflected from the eyes of the user 102. For example, if the amount of reflection light reflected from the eyes of the user 102 received by the eye tracking module 530 does not satisfy a specified condition (e.g., brightness), the processor 300 may control the second light source 232 to emit additional light.

Figure 10:
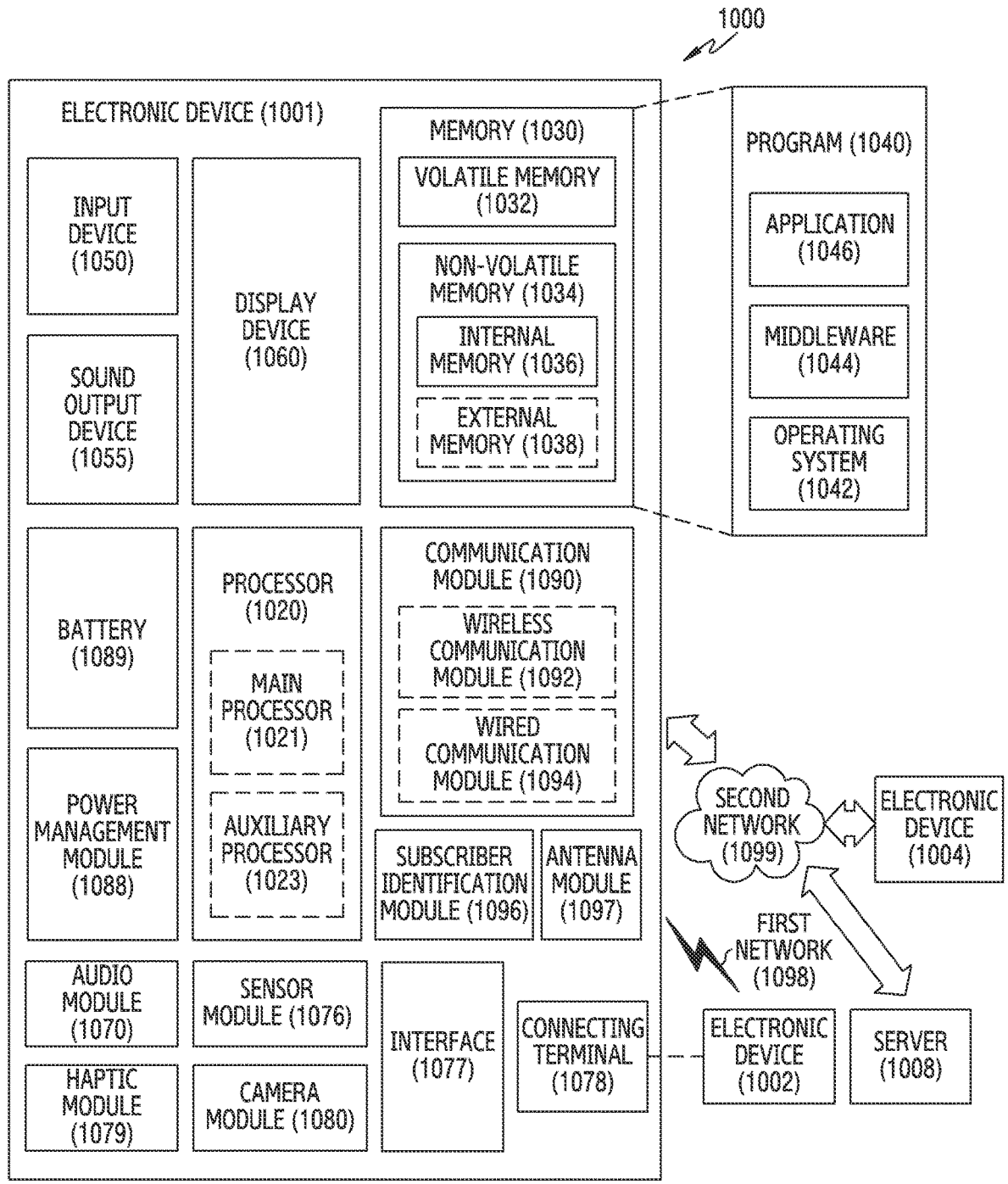
FIG. 10 is a block diagram of an electronic device in a network environment according to an embodiment of the disclosure.

FIG. 10 is a block diagram illustrating an electronic device in a network environment according to various embodiments of the disclosure.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020 (e.g., the processor 300), memory 1030, an input device 1050, a sound output device 1055, a display device 1060 (e.g., the display module 310), an audio module 1070, a sensor module 1076 (e.g., the sensor module 320), an interface 1077, a haptic module 1079, a camera module 1080 (e.g., the camera 350), a power management module 1088, a battery 1089 (e.g., the battery 340), a communication module 1090 (e.g., the communication interface 360), a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, Wi-Fi direct, or infrared data association (IrDA)) or the second network 1099 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, augmented reality glasses 100 may include a first light source 231 configured to emit display light for displaying an augmented reality image, an eye tracking sensor configured to detect reflection light reflected from the eyes of the user 102, a glass member 330 including a display waveguide 501 configured to guide the display light emitted from the first light source 231 to a display area of a see-through display 104 and an eye tracking (ET) waveguide 502 configured to guide the reflection light to the eye tracking sensor, and a processor 300 electrically connected to the first light source 231 and the eye tracking sensor. The processor 300 may control the first light source 231 to emit the display light and track a gaze of the user 102, based on the reflection light detected through the eye tracking sensor.

According to an embodiment, the display waveguide 501 may be disposed in a first area 401 of the glass member 330, and the eye tracking waveguide 502 may be disposed in a second area 411 that does not overlap the first area 401 of the glass member.

According to an embodiment, the first area 401 may be disposed in an upper portion of the glass member 330, and the second area 411 may be disposed in a lower portion of the first area 401.

According to an embodiment, the glass member 330 may further include a plurality of splitters disposed at one end and the opposite end of the display waveguide 501, and a plurality of splitters disposed at one end and the opposite end of the eye tracking waveguide 502.

According to an embodiment, a first splitter 511 disposed at one end of the display waveguide 501, among the plurality of splitters, may be disposed to condense the display light emitted from the first light source 231 on the display waveguide 501, and a second splitter 512 disposed at the opposite end of the display waveguide 501, among the plurality of splitters, may be disposed such that display light emitted from the display waveguide 501 is emitted to one surface of the glass member 330.

According to an embodiment, a third splitter 513 disposed at one end of the eye tracking waveguide 502, among the plurality of splitters, may be disposed to condense the reflection light on the eye tracking waveguide 502, and a fourth splitter 514 disposed at the opposite end of the eye tracking waveguide 502, among the plurality of splitters, may be disposed to guide reflection light emitted from the eye tracking waveguide 502 to the eye tracking sensor.

According to an embodiment, the augmented reality glasses 100 may further include a total-reflection mirror configured to change a path of the reflection light condensed on the eye tracking waveguide 502.

According to an embodiment, the eye tracking sensor may be disposed on an inner or outer surface of a second member 221 extending from a first member 211 adjacent to the glass member 330.

According to an embodiment, the augmented reality glasses may further include a total-reflection mirror disposed at one end of the eye tracking waveguide 502 so as to change a path of the reflection light condensed on the eye tracking waveguide 502 disposed on the glass member 330 and guide the reflection light whose path has been changed to the eye tracking sensor disposed on an inner or outer surface of the second member 221.

According to an embodiment, the augmented reality glasses 100 may further include a second light source 232 configured to emit additional light toward the eyes of the user 102.

According to an embodiment, the second light source 232 of the augmented reality glasses 100 may include a white LED or an infrared LED.

According to an embodiment, the processor 300 may control the first light source 231 such that an image frame is displayed on the display area, determine an illuminance value of the displayed image frame, based on a pixel value included in the image frame, and control the amount of additional light output from a second light source 232, based on the determined illuminance value of the image frame.

According to an embodiment, the augmented reality glasses 100 may further include an illuminance sensor configured to detect the amount of light.

According to an embodiment, the processor 300 may detect the ambient illuminance of the augmented reality glasses 100 through the illuminance sensor and emit additional light toward the eyes of the user 102 through a second light source 232 if the illuminance is less than or equal to a reference value.

According to an embodiment, the processor 300 may detect the brightness around the eyes of the user 102 through the illuminance sensor and emit additional light toward the eyes of the user 102 through a second light source 232 if the brightness is less than or equal to a reference value.

According to an embodiment, an operation method of augmented reality glasses 100 may include emitting display light for displaying an augmented reality image through a first light source 231. The display light emitted from the first light source 231 may be guided to a display area of a see-through display 104 through a display waveguide 501. The operation method of augmented reality glasses 100 may include detecting reflection light reflected from the eyes of the user 102 through an eye tracking (ET) sensor. The reflection light may be guided to the eye tracking sensor through an eye tracking (ET) waveguide 502. The display waveguide 501 and the eye tracking waveguide 502 may be included in a glass member 330 of the augmented reality glasses 100. The operation method of augmented reality glasses 100 may include tracking a gaze of the user 102, based on the detected reflection light.

According to an embodiment, the operation method of augmented reality glasses 100 may include performing control to emit additional light toward the eyes of the user 102 through a second light source 232.

According to an embodiment, the operation method of augmented reality glasses 100 may include performing control to emit the display light through the first light source 231. The operation method of augmented reality glasses 100 may include emitting additional light through the second light source 232 in the state in which the display light is emitted.

According to an embodiment, the operation method of augmented reality glasses 100 may include detecting the ambient illuminance of the augmented reality glasses 100 through an illuminance sensor. The operation method of augmented reality glasses 100 may include emitting additional light toward the eyes of the user 102 through the second light source 232 if the illuminance is less than or equal to a reference value.

According to an embodiment, the operation method of augmented reality glasses 100 may include detecting the amount of display light emitted from the first light source 231 through an illuminance sensor. The operation method of augmented reality glasses 100 may include emitting additional light toward the eyes of the user 102 through the second light source 232 if the amount of light is less than or equal to a reference value.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. Augmented reality (AR) glasses comprising:
    a first light source configured to emit display light for displaying an augmented reality image;
    an eye tracking (ET) sensor configured to detect reflection light reflected from a user's eyes;
    a glass member comprising a display waveguide configured to guide the display light emitted from the first light source to a display area of a see-through display and an eye tracking (ET) waveguide configured to guide the reflection light to the eye tracking sensor; and
    a processor electrically connected to the first light source and the eye tracking sensor,
    wherein the processor is configured to:
        control the first light source to emit the display light, and
        track a user's gaze, based on the reflection light detected through the eye tracking sensor.

2. The augmented reality glasses of claim 1,
    wherein the display waveguide is disposed in a first area of the glass member, and
    wherein the eye tracking waveguide is disposed in a second area that does not overlap the first area of the glass member.

3. The augmented reality glasses of claim 2,
    wherein the first area is disposed in an upper portion of the glass member, and
    wherein the second area is disposed in a lower portion of the first area.

4. The augmented reality glasses of claim 1, wherein the glass member further comprises:
    a plurality of splitters disposed at one end and an opposite end of the display waveguide; and
    a plurality of splitters disposed at one end and an opposite end of the eye tracking waveguide.

5. The augmented reality glasses of claim 4,
    wherein a first splitter disposed at one end of the display waveguide, among the plurality of splitters, is disposed to condense the display light emitted from the first light source on the display waveguide, and wherein a second splitter disposed at the opposite end of the display waveguide, among the plurality of splitters, is disposed such that display light emitted from the display waveguide is emitted to one surface of the glass member.

6. The augmented reality glasses of claim 4, wherein a third splitter disposed at one end of the eye tracking waveguide, among the plurality of splitters, is disposed to condense the reflection light on the eye tracking waveguide, and wherein a fourth splitter disposed at the opposite end of the eye tracking waveguide, among the plurality of splitters, is disposed to guide reflection light emitted from the eye tracking waveguide to the eye tracking sensor.

7. The augmented reality glasses of claim 1, further comprising:

a total-reflection mirror configured to change a path of the reflection light condensed on the eye tracking waveguide.

8. The augmented reality glasses of claim 1, wherein the eye tracking sensor is disposed on an inner or outer surface of a second member extending from a first member adjacent to the glass member.

9. The augmented reality glasses of claim 8, further comprising:

a total-reflection mirror disposed at one end of the eye tracking waveguide so as to change a path of the reflection light condensed on the eye tracking waveguide disposed on the glass member and guide the reflection light whose path has been changed to the eye tracking sensor disposed on an inner or outer surface of the second member.

10. The augmented reality glasses of claim 1, further comprising:

a second light source configured to emit additional light toward the user's eyes.

11. The augmented reality glasses of claim 10, wherein the second light source comprises a white light-emitting diode (LED) or an infrared LED.

12. The augmented reality glasses of claim 1, wherein the processor is further configured to:

control the first light source such that an image frame is displayed on the display area;

determine an illuminance value of the displayed image frame, based on a pixel value included in the image frame; and control an amount of additional light output from a second light source, based on the determined illuminance value of the image frame.

13. The augmented reality glasses of claim 1, further comprising:

an illuminance sensor configured to detect an amount of light.

14. The augmented reality glasses of claim 13, wherein the processor is further configured to:

detect an ambient illuminance of the augmented reality glasses through the illuminance sensor; and emit additional light toward the user's eyes through a second light source in response to the illuminance being less than or equal to a reference value.

15. The augmented reality glasses of claim 13, wherein the processor is further configured to:

detect a brightness around the user's eyes through the illuminance sensor; and emit additional light toward the user's eyes through a second light source in response to the brightness being less than or equal to a reference value.

* * * * *